(12) United States Patent  
Shadwick

(10) Patent No.: US 8,997,331 B2
(45) Date of Patent: Apr. 7, 2015

(54) METHOD OF FABRICATING AN ANALYZER

(75) Inventor: David Thomas Shadwick, Wilmore, KY (US)

(73) Assignee: Lexmark International, Inc., Lexington, KY (US)

( * ) Notice: Subject to any disclaimer, the term of this patent is extended or adjusted under 35 U.S.C. 154(b) by 578 days.

(21) Appl. No.: 13/353,387

(22) Filed: Jan. 19, 2012

(65) Prior Publication Data

US 2012/0110806 A1     May 10, 2012

Related U.S. Application Data

(62) Division of application No. 12/344,803, filed on Dec. 29, 2008, now Pat. No. 8,212,575.

(51) Int. Cl.
*G01R 31/28* (2006.01)
*G01B 7/00* (2006.01)
*B41J 3/46* (2006.01)

(52) U.S. Cl.
CPC .. *G01B 7/003* (2013.01); *B41J 3/46* (2013.01)

(58) Field of Classification Search
USPC ......................................... 29/25.01, 593, 846
See application file for complete search history.

(56) References Cited

U.S. PATENT DOCUMENTS

| 4,549,093 A * | 10/1985 | Severwright ................. 307/147 |
| 7,481,120 B2 * | 1/2009 | Gravesen et al. ........ 73/862.042 |
| 2006/0016275 A1 * | 1/2006 | Gravesen et al. ........ 73/862.042 |

* cited by examiner

*Primary Examiner* — Carl Arbes

(57) ABSTRACT

A matrix analyzer for determining the size and location of a conductive item placed thereon. The matrix analyzer includes plural row conductors and column conductors with a corresponding grid of conductive areas exposed on the surface of the matrix analyzer. When a conductive item, such as an ink droplet, is jetted onto the matrix analyzer, the intersection of various row conductors and column conductors exhibit a low resistance. The rows and columns of the matrix analyzer can be sequentially accessed to find those intersections where the low resistance exists. From such data, the size and location of the ink droplets can be determined.

3 Claims, 3 Drawing Sheets

US 8,997,331 B2

METHOD OF FABRICATING AN ANALYZER

This application claims priority and benefit as a divisional application of U.S. application Ser. No. 12/344,803, filed Dec. 29, 2008 now U.S. Pat. No. 8,212,575, entitled "Device for Analyzing Size and Location of Conductive Item."

BACKGROUND

1. Field of the Invention

The present invention relates in general to methods and apparatus for analyzing certain characteristics of conductive items, and more particularly to matrix analyzers for identifying the characteristics of an ink droplet jetted from an inkjet printer.

2. Description of the Related Art

The operation of the printhead of an inkjet printer involves the jetting of a droplet of ink onto a print medium, such as paper. The printhead is constructed with an array of nozzles through which the ink is jetted into very small droplets. In order to produce an image on the print medium, such as words, letters or symbols, the size and location of the ink droplets is critical and must be within predetermined specifications. Thus, when manufacturing inkjet printheads, it is necessary to conduct tests thereon in order to assure that every nozzle is not only operational, but also to verify that the size and location of the droplet is within specified limits. During the use of printheads in inkjet printers, it becomes necessary to periodically conduct tests in order to verify the proper operation of the nozzles of the printhead. There are many other areas in other technologies where the size and/or location of a conductive item is required to be determined with specificity.

The analysis of the size of an ink droplet jetted from the printhead of an inkjet printer, and placement thereof in relation to the droplets of other printhead nozzles, has typically been performed using visual techniques. Owing to the fact that printhead designs have advanced to the point where the ink droplet is barely visible to the naked eye, the visual analysis has been made much more difficult. The visual analysis technique typically requires the determination of a light to dark threshold of the boundaries of the ink droplet. A printhead is tested by printing a test page. The characters of the test page are magnified using a high resolution camera. The magnified images are then visually inspected to verify whether the printhead nozzles have operated properly. With this technique, it is difficult to distinguish the boundary of the color yellow with the white test paper. When different colored inks are employed, the imaging device requires special control and special handling of the digital representation of the image to determine the size and location of the ink droplet. The size and location characteristics of the droplet jetted from a printhead is important to assure the quality of the printhead. However, the existence of any smaller satellite droplets adjacent to the primary ink droplet is also critical to the determination of the operability of the printhead. It can be appreciated that when using an invisible or transparent liquid, the visual analysis thereof is made much more difficult.

From the foregoing, it can be seen that a need exists for a method and corresponding apparatus for detecting size/location characteristics of an ink droplet by electrical means. A further need exists for a technique to detect the size and location characteristics of an ink droplet that is transparent. Yet another need exists for a technique to determine the size and location characteristics of an ink droplet with an accuracy and speed much better than currently available with visual techniques. A further need exists for a semiconductor device that can detect the size and location characteristics of an ink droplet with very high accuracy, and at a low cost.

SUMMARY OF THE INVENTION

In accordance with the principles and concepts of the invention, disclosed is an analysis device having a matrix of closely spaced and extremely small conductive areas. The matrix of conductive areas is located on the surface of the device so that when a droplet of ink is jetted thereon, the conductive ink reduces the resistance between the conductive areas. The number and location of the bridging resistance between the conductive areas of the device can be used to determine the size and location of the ink droplet.

The conductive areas of the matrix are arranged in rows and columns. Each row of conductive areas is connected in the substrate of the device to a respective row conductor. Similarly, each column of conductive areas is connected in the substrate of the device to a respective column conductor. By accessing the rows and columns of conductors of the matrix, the resistance there between can be determined. With this data, the size and location of the ink droplet and any satellites can be determined. By making the conductive areas in the submicron area, as well as the spacing there between, the resolution in determining the size and location can be significantly higher than currently available with visual techniques.

In accordance with another features of the invention, disclosed is an ink droplet analyzer that is constructed in a semiconductor substrate, together with electrical circuits for accessing the row and column conductors to ascertain the resistance there between. The device need only be accessed with a row address and a column address to determine the resistance there between. When every combination of row and column addresses have been accessed, the resulting data can be stored and analyzed to identify the specific size of the ink droplet, as well as its location. Indeed, multiple primary ink droplets can be analyzed in response to the simultaneous firing of multiple inkjet nozzles.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
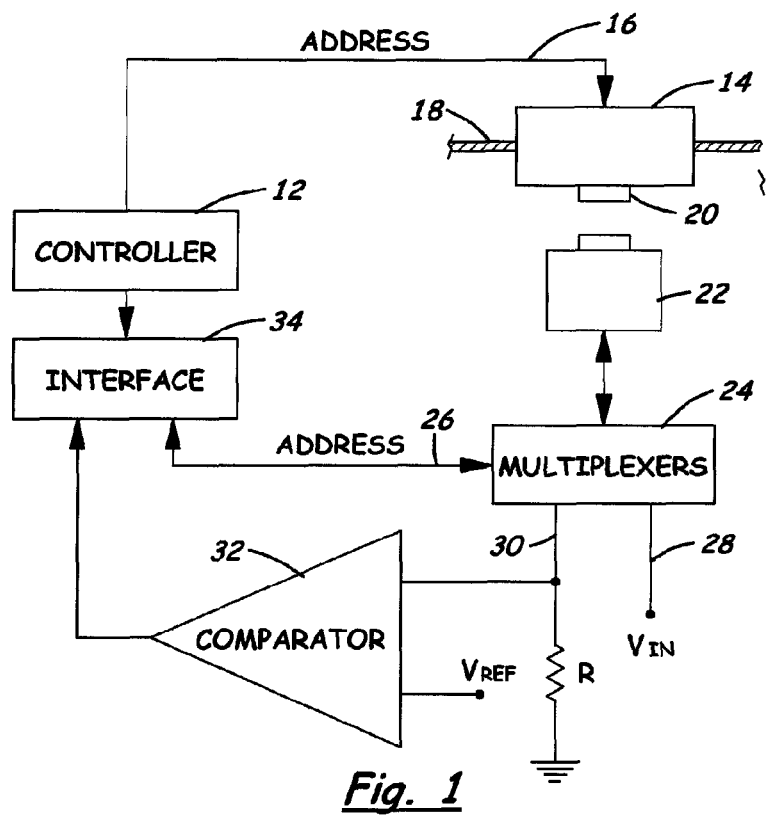
FIG. 1 is a block diagram of an inkjet printer employing the features of the invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

The present invention provides a system and method for determining the size and location of ink droplets jetted from the nozzles of an inkjet printhead. The term image as used herein encompasses any printed or digital form of text, graphic, or combination thereof. The term output as used herein encompasses output from any printing device such as color and black-and-white copiers, color and black-and-white printers, and so-called "all-in-one devices" that incorporate multiple functions such as scanning, copying, and printing capabilities in one device. Such printing devices may utilize ink jet, dot matrix, dye sublimation, laser, and any other suitable print formats.

FIG. 1 illustrates an embodiment of an inkjet printer 10 and associated system for analyzing the ink droplets to determine characteristics thereof, including the size and relative location with respect to other ink droplets. A controller 12 is programmed to control the various functions of the printer 10. The controller 12 is connected to a printhead 20, though an ink cartridge 14, by an address bus 16. The controller 12 can address the printhead 20 to cause a specific nozzle from an array of nozzles, to jet a droplet of ink. The ink cartridge 14 and printhead 20 can be moved in a swath back and forth by a carriage mechanism, shown as numeral 18, to print charac-ters on a print media. In particular, the printhead 20 can be moved to the position shown so as to be proximate to a matrix analyzer 22. As will be described in detail below, the matrix analyzer 22 can provide data indicative of the size of each nozzle droplet, as well as the location of each droplet in relation to the other droplets.

The system includes row and column multiplexers 24 for accessing each row and column of the matrix analyzer 22 to obtain data concerning the relative resistance there between, it being realized that an ink droplet contains substantial water which has a known resistance that can be detected. Indeed, special testing inks can be utilized which have a low resistance to facilitate detection thereof, especially during factory testing of the printheads. The row and column multiplexers 24 are addressed with address bus 26 by the controller 12. The row and column multiplexers 24 allow a single row and a single column of the matrix analyzer 22 to be sequentially accessed to determine the resistance at different locations thereon. In one embodiment of the invention, an input voltage Vin is applied on line 28 of one multiplexer (row, for example), and a resulting voltage is received on line 30 of the other multiplexer (column, for example), which voltage is a function of the row/column resistance. When no ink is present at a particular location, the resistance will be high, and when an ink droplet is present, the row/column resistance may be in the range of about 1,000-2,000 Ohm. The input voltage Vin divides between the ink resistance and the resistance of the fixed resistor R. A comparator 32 compares the voltage on output line 30 with a reference voltage Vref and provides an output logic signal corresponding to whether or not an ink droplet was detected. An interface 34 can be controlled by the controller 12 to allow addresses to be transmitted to the multiplexers 24, as well as receive the digital signals generated by the comparator 32.

In practice, a number of samples are taken from the matrix analyzer 22 in order to determine the existence of each ink droplet jetted from the printhead 20, and analyze the data for size and location. In some embodiments, this may be carried out by accessing a row of the matrix analyzer 22, and then sequentially accessing every column of the matrix analyzer 22. If there are 4,096 columns, for example, then in the first sequence there would be a resulting 4,096 voltage samples (corresponding to resistance) taken at physically spaced intervals of the selected row. Then, 4,096 samples of each of the other rows are obtained in the same manner. If there are also 4,096 rows, then the total number of samples taken from the matrix analyzer 22 would be 16,777,216. Of course, the number of rows and columns, and the spacing there between, are dependent on the resolution required and/or the physical size of the footprint of the conductive item being analyzed. As will be described in more IS detail below, the processing of the digital signals output from the comparator 32 is carried out to determine the size of each ink droplet jetted onto the matrix analyzer, and the specific location thereof.

The matrix analyzer 22 can be mounted in the printer 10 at a maintenance location, namely at an off-page location. When it is desired to analyze the spot size and location of each ink droplet jetted from the nozzle of the printhead 20, the controller 12 can move the printhead 20 to the maintenance location in front of the matrix analyzer 22. Then, the controller 12 can carry out a maintenance routine in which all nozzles of the printhead 20 are fired to jet a corresponding droplet of ink onto the planar surface of the matrix analyzer 22. The accessing of the matrix analyzer 22 is carried out in the manner noted above to determine where each ink droplet landed on the matrix analyzer 22, the spot size of each droplet, and any satellite droplets. The operability of the printhead 20 can thus be determined during an in-printer analysis. By electrically analyzing the data received from the matrix analyzer 22 for the presence and absence of ink droplets, the color of the ink becomes irrelevant. The boundary of a yellow ink droplet can be distinguished with as much precision as other colors.

It should be noted that the principles and concepts of the invention can also be utilized to test each new printhead at the factory using the same technique. In other words, a new printhead can be placed in a socket-like device that is located over the matrix analyzer 22. One or more, or all of the nozzles, or a pattern of nozzles can be fired and the results analyzed according to the features of the invention to determine if the printhead is acceptable for use in a printer or other reproduction apparatus. It should also be noted that the matrix analyzer 22 can be of a size to allow an entire swath of printing data to be captured on the fly, and then analyzed. In this case, the length (number of columns) would be much larger than the number of rows of the matrix analyzer 22. The swath of printing can be analyzed to determine dynamic characteristics of the printhead 20, such as the effect of eddy currents of air around the jetted droplet of ink, and the effects of the lateral movement of the printhead 14 during the jetting process. Indeed, the matrix analyzer 22 can be read and the data stored and then played back in slow motion to visually see the actual path taken by the ink droplets during jetting from the moving printhead. The controller 12 has information concerning the actual position of the printhead 20 during ejection of the ink, and can use such information, together with the data received from the matrix analyzer 22, to determine the dynamics of the ink trajectory path.

Figure 2:
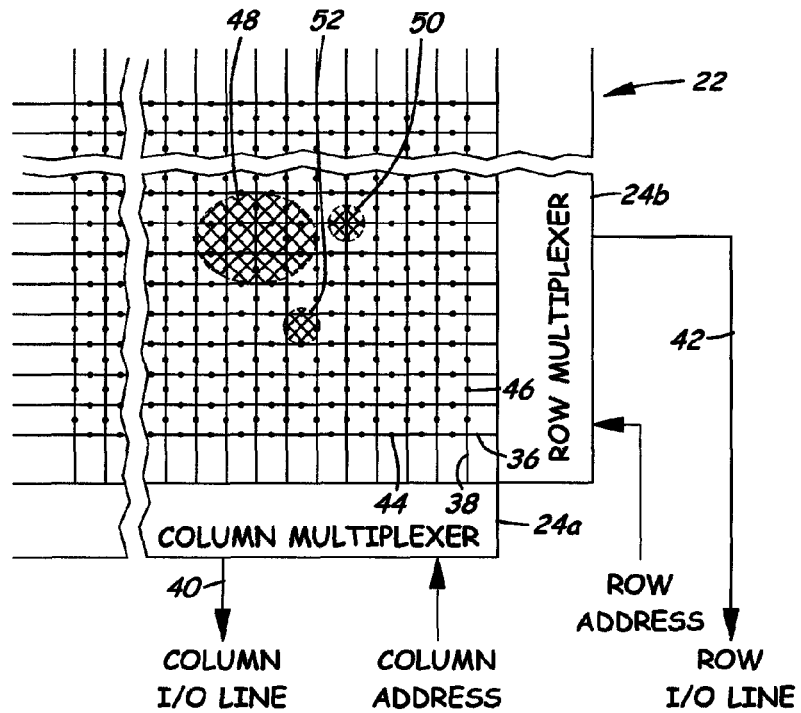
FIG. 2 is a top view of the analyzer according to one embodiment, showing the matrix of conductive areas, the rows and columns of conductive traces, and the multiplexers for accessing the rows and columns of conductor traces.

Reference is now made to FIG. 2, where the details of the matrix analyzer 22 are illustrated. The matrix analyzer 22 is constructed as an x-y matrix with plural conductive row traces, one shown as numeral 36, and with plural conductive column traces, one shown as numeral 38. The number of row traces 36 and the number of column traces 38 are determined by the resolution desired. With more row and column traces per unit area, the resolution of the matrix is increased. In an embodiment where the matrix analyzer 22 is utilized for the testing of an inkjet printhead, the resolution should be greater than the dimensional aspects of the printhead nozzles. Printhead nozzles can jet micro-droplets of ink having diameters ranging from about 1 micron to greater than 50 micron. The resolution of the matrix analyzer 22 should accommodate these dimensions.

The rows 36 of conductive traces are connected to a row multiplexer 24b, and the column of conductive traces 38 are connected to a column multiplexer 24a. The multiplexers 24a and 24b are of the type having analog switches for selecting and connecting a particular trace to the single multiplexer input/output conductor. For example, the column multiplexer 24a can be addressed to select a single column trace 38 and connect it internally via an analog switch to the I/O line 40. Similarly, the row multiplexer 24b can be addressed to select a single row trace 36 and connect it internally via an analog switch to the row I/O line 42.

The row and column traces 36 and 38 of the matrix analyzer 22 include conductive areas, such as conductive area 44 for the row trace 36 and conductive area 46 for column trace 38. Indeed, formed in contact with the row trace 36 are a number of contact areas. The row trace contact areas 44 are located on the row traces 36 at respective locations between the column traces 38. In like manner, the column trace contact areas 46 are located on the column traces 38 at respective locations between the row traces 36. The contact areas 44 and 46 form a grid or matrix that extend to and are exposed at the surface of the matrix analyzer 22. The surface of the matrix analyzer 22 is planar in the preferred embodiment, but could be other shapes in order to accommodate other analyzing situations and applications. Thus, any conductive item that comes into contact with the surface of the matrix analyzer 22 can be analyzed to determine the size and location thereof.

An example ink droplet 48 is shown to cover a number of conductive areas of IS the matrix analyzer 22. A first satellite droplet 50 and a second satellite droplet 52 are shown smaller in size and also cover a smaller number of conductive areas. The primary ink droplet 48 in contact with the plural conductive areas can be analyzed to determine its shape and size by the number of conductive areas short circuited by the ink liquid. The location of the ink droplet 48 can be determined by analyzing the location of the shorted conductive areas. The term "short circuited" as used herein means the bridging of the row and column conductive traces by the resistance of the ink liquid, which is not zero but on the order of a few kilo ohms. The determination of the existence of a satellite ink droplet may or may not render the printhead defective, depending on the number and size of such satellite droplets. A satellite ink droplet may arise from the dispersion of a primary ink droplet into multiple droplets during the jetting operation. While not shown, all of the ink droplets of a printhead nozzle array are preferably jetted onto the matrix analyzer 22 so that the relative location between the ink droplets can also be analyzed to verify that they are aligned in a straight row, and not in an irregular row. The determination of an irregular row of ink droplets may indicate that one or more jets of the printhead 14 are not jetting the droplets straight out of the respective nozzles, but jetting the droplets sideways. When employed in inkjet printers during a maintenance mode, the grid surface of the matrix analyzer 22 can be cleaned using a squeegee moved across the face thereof.

Figure 3:
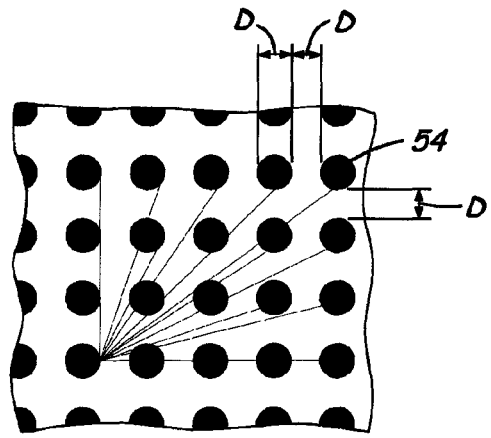
FIG. 3 is a top view of a portion of the matrix analyzer, showing an enlarged size and placement of the grid of conductive areas.

FIG. 3 illustrates in a much enlarged form an example of the conductive areas exposed at the top surface of the matrix analyzer 22 in accordance with one embodiment. In this example, the conductive areas 54 are circular in surface area with a diameter D. The spacing between the rows and columns of conductive areas 54 are also of a dimension D. Typically, the spacing between the conductive areas 54 should be about half the diameter of the smallest droplet of interest. Other conductive area shapes can be employed by those skilled in the art, and other dimensions can be utilized, where the spacing between the conductive areas 54 need not be the same as the conductive area diameter. With the semiconductor processing techniques and equipment allowing nanometer trace widths, the number of conductive areas per unit area can be extremely high, thereby increasing the resolution.

Figure 4:
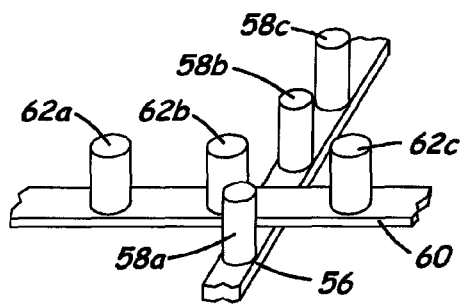
FIG. 4 is an isometric view of a portion of the matrix analyzer, showing a conductive row trace and the corresponding conductive pillars, and a number of conductive column traces and the corresponding conductive pillars.

FIG. 4 is an isometric view of a portion of the matrix analyzer 22, showing the relationship between a column trace 56 with its associated conductive pillars 58a, 58b and 58c, and a row trace 60 and its associated conductive pillars 62a, 62b and 62c. The top surfaces of the conductive pillars 58 and 62 are exposed at the surface of the matrix analyzer 22. As can be seen, the conductive column trace 56 underlies the conductive row trace 60. As such, the length of the conductive column pillars 58 are longer than the length of the conductive row pillars 62. This is because the top surfaces of the conductive row and column pillars 58 and 62 all lie in the same plane at the surface of the matrix analyzer 22.

Figure 5:
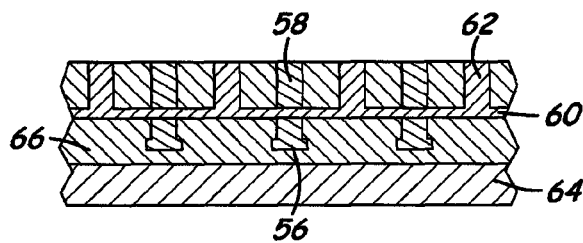
FIG. 5 is a cross-sectional view of the conductive row and column traces and the corresponding conductive pillars of FIG. 4.

FIG. 5 is a cross-sectional view through the matrix analyzer 22 showing the construction of the row and column conductive structures. The starting structure is a semiconductor wafer 64. The active circuits, such as the multiplexers 24 and other circuits, can be formed in the peripheral areas of a semiconductor chip formed in the semiconductor wafer 64. An insulating material 66 is deposited to a first depth over the semiconductor wafer. The insulating material 66 can be a conventional glass spun over the surface of the semiconductor wafer. Other insulating materials, such as silicon dioxide, that are commonly used in semiconductor processes can also be used. Formed on the first layer of the insulating material 66 are the lower conductive traces, in one embodiment the column traces 56. The column traces 56 can be formed by depositing a layer of aluminum, gold, tantalum or other conductive material on the surface of the first layer of the insulating material 66. Alternatively, the column traces 56 can be formed directly on the semiconductor material 64. Then the conductive material 66 is masked and etched to leave the parallel column traces 56. Next, a second layer of insulting material 66 is deposited over the first insulating layer 66 and on top of the column traces 56. A layer of conductive material is then deposited over the second layer of insulating material 66, and masked and etched to form the parallel row traces 60. The row traces 60 are preferably orthogonal to the column traces 56, although this is not a necessity. The column traces 56 are thus insulated from the row traces 60 by the second layer of insulating material. A third layer of insulating material is then formed over the wafer structure to cover the row traces 60.

The structure is further processed to form the column conductive pillars 58 and the row conductive pillars 62. The wafer structure is processed to form a mask there over, which includes openings over the column traces 56, at locations where the conductive column pillars 58 are to be formed. In one embodiment, the column pillars 58 are formed in contact with the respective column traces 56, between the row traces 60. To that end, a conductive material is deposited over the surface of the wafer structure so that it fills the holes in the insulating material 66 and contacts the underlying column traces 56. The conductive material filling the holes in the insulating material 66 need not be the same conductive material as the conductive traces. Rather, the conductive material filling the holes in the insulating material 66 can be of a type that resists any corrosion posed by the liquid ink. Tantalum can be used as a pillar material. In any event, the layer of conductive material is masked and etched to leave the top surfaces of the column pillars 58 exposed.

The row pillars 62 can be formed by removing the previous mask and forming another mask with openings over the row traces 60. The row pillar openings in the mask should preferably be located between the column traces 56. A conductive material is then deposited over the surface of the mask so that it fills the row pillar openings and is in contact with the respective row traces 60. The layer of conductive material is then masked and etched to leave the circular top surfaces of the row pillars 62 exposed. The mask is then removed. The top surface of the wafer structure can be subjected to a final etching or grinding process in order to make the top surface smooth and planar with the top surfaces of the row and column pillars 62 and 58.

Figure 6:
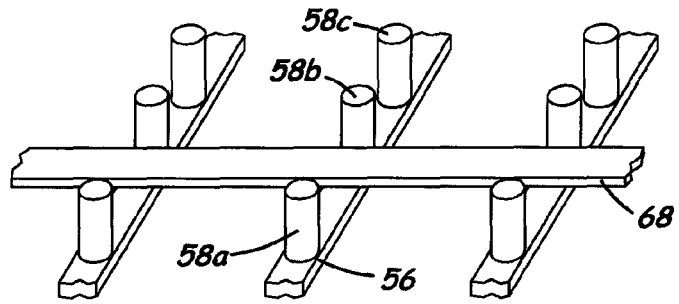
FIG. 6 is an isometric view of a portion of the matrix analyzer according to another embodiment, showing a conductive row trace without conductive pillars, and a number of conductive column traces and corresponding conductive pillars.
Figure 7:
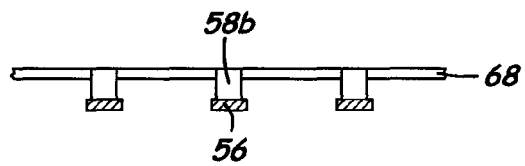
FIG. 7 is a side view of the matrix structure of FIG. 6.

FIGS. 6 and 7 illustrate another embodiment of the construction of the conductive traces and pillars. Here, the column traces 56 and corresponding conductive pillars 58*a*-58*c* are constructed in the same manner as described above. However, the conductive row traces 68 are constructed without pillars. Rather, the conductive row traces 68 are formed with the top elongate surfaces exposed. As can be seen in FIG. 7, the top surface of the row trace 68 is planar with the top surfaces of the column pillars 58*b*. The gathering of resistance data in response to the placement of a conductive item in contact with the top surface of the matrix analyzer of FIGS. 6 and 7 is the same as described above.

In the embodiments of the matrix analyzer illustrated in FIGS. 4-7, it should be understood that the conductive row traces could be formed first, and then the conductive column traces formed there over. In addition, the number of conductive row traces need not equal the number of conductive column traces, as the matrix analyzer of the invention allows a high degree of scalability in choosing a number of conductive column traces that are independent from the number of conductive row traces. Indeed, in the utilization of the matrix analyzer in a page-wide application, it would have a significant larger number of column traces and associated conductive pillars, as compared to the number of conductive row traces and associated conductive pillars.

As yet another alternative, it can be appreciated that both the conductive row traces and the conductive column traces can be fabricated without corresponding conductive pillars. Rather, the bottom conductive column traces can be constructed with portions or segments having upper surfaces planar with the top surface of the linear row traces. The other portions of the column traces are formed under the row traces and insulated there from. In other words, the column traces are not linear, but have portions that are bridged under the conductive row traces. In all other respects, the operation of such a matrix analyzer is the same as that described above.

Figure 8:
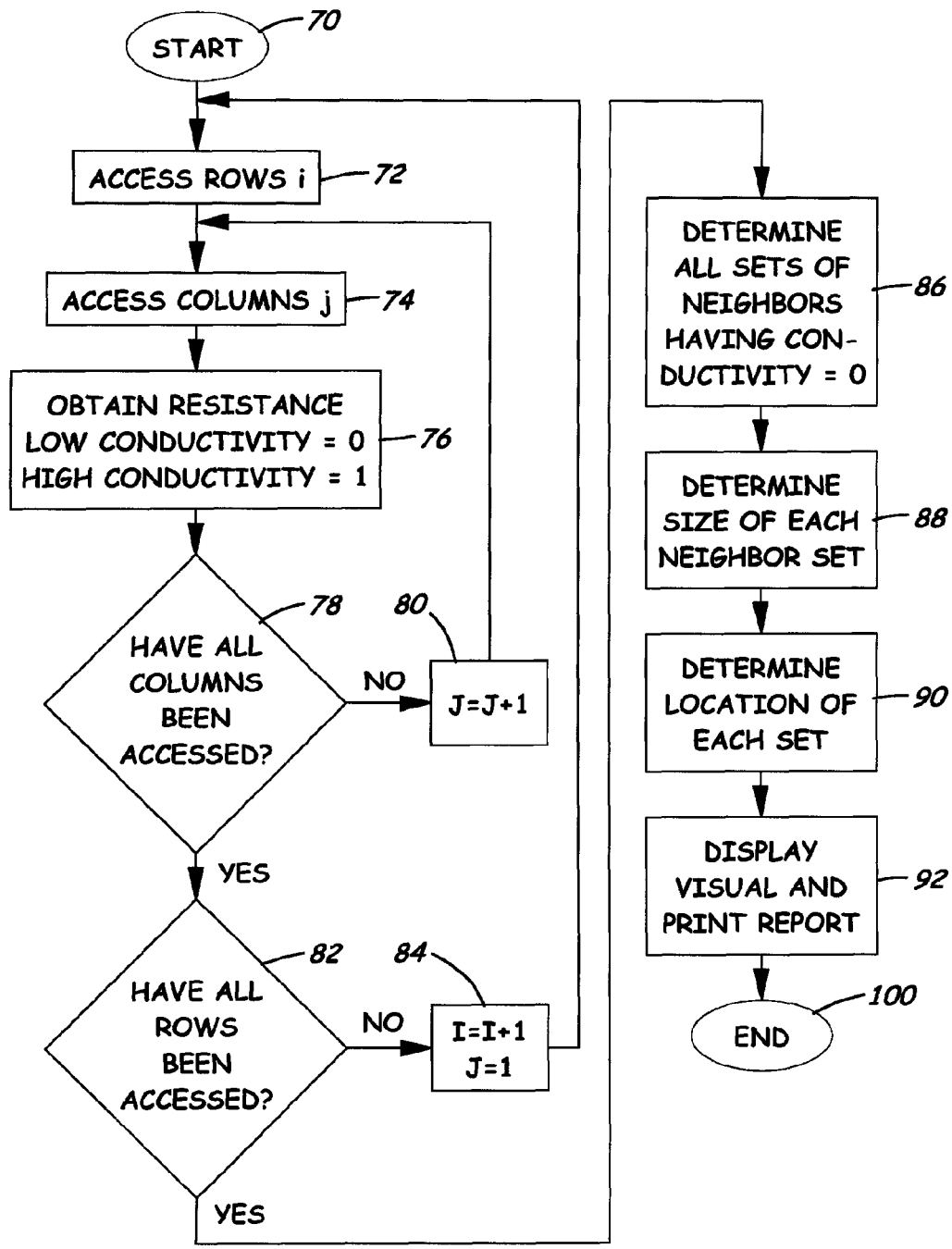
FIG. 8 is a flow chart illustrating in simplified form an algorithm for employing the matrix analyzer of FIG. 2 and determining the size and location of the ink droplets jetted thereon.

With reference now to FIG. 8, illustrated is a flowchart of the operations carried out by the controller 12 in identifying a conductive item placed on the matrix analyzer 22 in accordance with one illustrative embodiment. The process starts 70 by accessing a first row i of the matrix shown in FIG. 2. This is shown in program flow block 72. The number of rows and the number of columns of the matrix analyzer 22 are known in advance and stored in the memory of the controller 12. Processing continues with block 74 where the first column j of the matrix is accessed. In block 76, the controller 12 obtains the resistance value of the intersection of the accessed row and column. If the resistance is low (about 1 k-2 k Ohm for ink), the conductivity is high, and thus the conductivity is assigned a value of zero. If the value of resistance is high, then the conductivity is low. In this situation, the conductivity is assigned a value of one, meaning there is essentially an open circuit between the intersection of the accessed row and column of the matrix.

Processing continues with decision block 78, where it is determined if all of the columns have been accessed. If the decision is negative, then processing branches to block 80 where the value of the column j is incremented by one, meaning that the next column is accessed. Processing continues through blocks 74-78 until all columns of the matrix have been accessed, whereupon processing branches from decision block 78 to decision block 82. In decision block 82 it is decided if all of the rows of the matrix have been accessed. If not, then processing branches to block 84 where the first row i is incremented by one, and the column value j is reset back to unity. Processing proceeds back to block 72 and then through blocks 74-84 where the second row of the matrix is accessed in connection with all of the columns. Eventually the resistance values of the intersections of all of the rows and all of the columns are obtained and stored in the memory of the controller 12. When this occurs, processing branches from decision block 82 to block 86 where all sets of conductance with values of zero are determined. In other words, the set of conductance values of zero pertaining to the existence of an ink droplet 48 of FIG. 2 are gathered. Similarly, the two sets of conductance values of zero pertaining to the satellite ink droplets 50 and 52 are also gathered. By determining the number of zero conductance values for a set indicates the size of the ink droplet. The size of each ink droplet 48, 50 and 52 is determined in block 88. As noted above, and in practice, the matrix analyzer 22 will determine the size and location of each ink droplet from each nozzle of the printhead 20. In block 90, the location of each ink droplet is determined. The matrix analyzer 22 is constructed with the conductive pillar surfaces at defined coordinate locations, and thus the x and y coordinates where the set of conductance values equal zero can be determined, and thus the location where each ink droplet has been deposited on the matrix analyzer 22.

In program flow block 92, the data gathered and processed is displayed in magnified form on a visual display to show the relative positions of all of the ink droplets, and the relative sizes thereof. A quick judgment can thus be made as to whether the printhead is operating in an acceptable manner. In addition, for records purposes, a printout of the results can also be made. The program processing of the matrix data ends, as noted in block 100.

From the foregoing, disclosed are several embodiments and several methods of fabricating a matrix analyzer that can be efficiently used to identify the size and the location of ink droplets. The utilization of the features of the invention is not limited to the use with inkjet printers or ink printheads. Rather, the matrix analyzer can be utilized to capture finger prints and store the corresponding data and compare the same with other finger print samples to find a match. Other uses of the matrix analyzer may involve the determination of nozzle bursts of medicine in atomizers in the medical industry. Nozzle-type printers employed in marking products advancing in a production line can also be automatically tested by moving the same to a test location proximate the matrix analyzer. Moreover, the matrix analyzer of the invention can be used in conjunction with liquids other than ink, as long as the liquid has a resistance that can be distinguished from the resistance of the isolation material in which the conductive traces and pillars are embedded. Those skilled in the art will find yet other uses for the features of the matrix analyzer according to the invention.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

The invention claimed is:

1. A method of fabricating an analyzer for analyzing a conductive item, comprising:

forming a plurality of conductive row traces at a first level in an insulating substrate;

forming a plurality of conductive column traces at a second level in an insulating substrate;

forming conductive pillars from a surface of the analyzer to the respective conductive row and column traces, whereby a conductive item placed on the surface of the analyzer can be analyzed to determine at least a location or a size thereof;

forming a row multiplexer connected to the conductive row traces, and forming a column multiplexer connected to the conductive column traces; and forming the row and column multiplexers in a semiconductor substrate which is integral with the analyzer.

2. A method of fabricating an analyzer for analyzing a conductive item, comprising:

forming a plurality of conductive row traces at a first level in an insulating substrate;

forming a plurality of conductive column traces at a second level in an insulating substrate;

forming conductive pillars from a surface of the analyzer to the respective conductive row and column traces, whereby a conductive item placed on the surface of the analyzer can be analyzed to determine at least a location or a size thereof;

forming a row multiplexer connected to the conductive row traces, and forming a column multiplexer connected to the conductive column traces;

obtaining samples of electrical signals received from at least one said multiplexer, and digitizing the samples and storing the digital samples; and using a comparator for comparing the samples with a threshold voltage to determine a digital value to assign to the sample.

3. A method of fabricating an analyzer for analyzing a conductive item, comprising:

forming a plurality of conductive row traces at a first level in an insulating substrate;

forming a plurality of conductive column traces at a second level in an insulating substrate;

forming conductive pillars from a surface of the analyzer to the respective conductive row and column traces, whereby a conductive item placed on the surface of the analyzer can be analyzed to determine at least a location or a size thereof;

mounting the analyzer in an inkjet printer at a location where a printhead can jet ink droplets on the surface of the analyzer, and analyzing the data received from the analyzer for determining a size and a location of an ink droplet.

\* \* \* \* \*